April 24, 1956 H. HERZER 2,742,937
HIGH-SPEED MEAT-CUTTER, MIXER AND EXTRUDER
Filed April 30, 1952 2 Sheets-Sheet 1
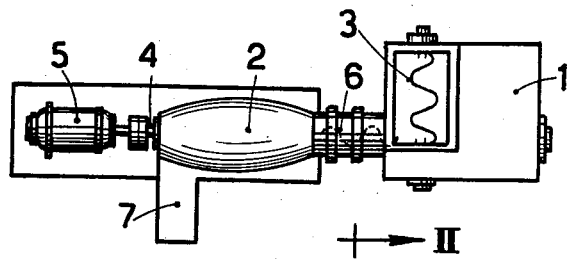
Fig.1.
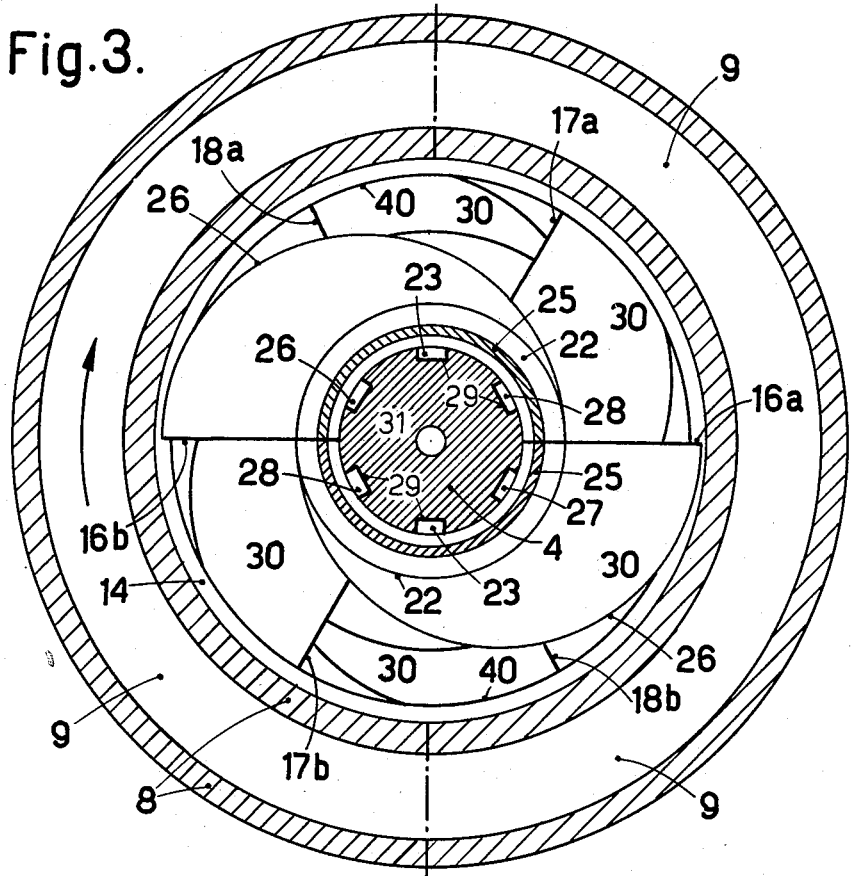
Fig.3.
Fig.4.
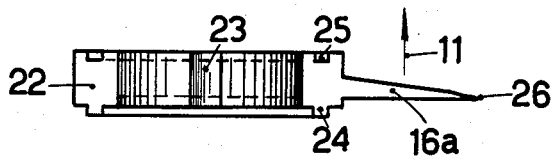
Inventor
Hermann Herzer
by Karl Michaelis, Atty.

April 24, 1956  H. HERZER  2,742,937
HIGH-SPEED MEAT-CUTTER, MIXER AND EXTRUDER
Filed April 30, 1952  2 Sheets-Sheet 2
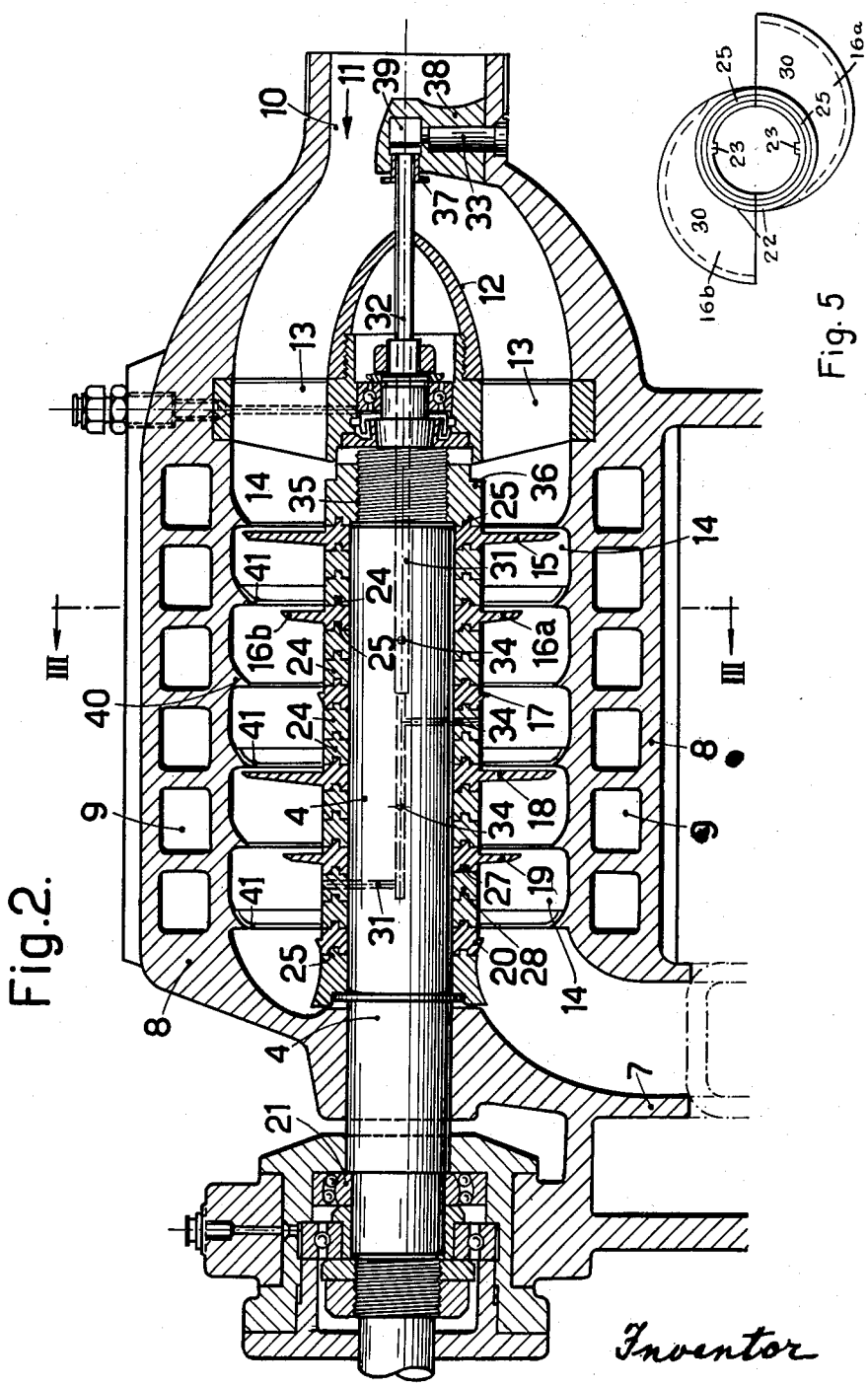
Inventor
Hermann Herzer
by Karl Michaelis
  atty.

United States Patent Office 2,742,937
Patented Apr. 24, 1956

2,742,937
HIGH-SPEED MEAT-CUTTER, MIXER, AND EXTRUDER

Hermann Herzer, Basel, Switzerland, assignor to Bell Aktiengesellschaft, Basel, Switzerland, a joint-stock company of Swiss law Application April 30, 1952, Serial No. 285,282

Claims priority, application Switzerland February 9, 1952

2 Claims. (Cl. 146—182)

This invention relates to a comminuting device and more especially to a rotary cutting machine adapted for use in cutting up meat and similar materials in a continuous operation to a high degree of fineness, mixing it with water or the like and extruding it in paste form.

It is an object of my invention to provide a rotary cutting machine operating at high speed and which is capable of reducing meat and more especially animal raw fat tissue within a short period of time to a paste-like mass enabling the fatty matter to be recovered by melting at a temperature not exceeding about 70° C. and also preparing sausage masses with a particularly fine distribution of their particles.

It is a further object of this invention to provide a device of the kind described which allows the water to be admixed to the meat to be incorporated in the meat or other material right in the chopping device, thereby so intimately binding the water to the finely comminuted albuminous matter that the water is combined so firmly with the swollen albumen up to about 50% by weight of the meat itself that it cannot be separated from the meat by boiling.

In the drawings affixed to this specification and forming part thereof, an embodiment of a device according to this invention is illustrated diagrammatically by way of example.

In the drawings—

Fig. 1 is a schematic plan view of the device as a whole, while

Fig. 2 is a vertical axial section on the line II—II in Fig. 3 drawn to a larger scale.

Fig. 3 is a cross-section on the line III—III in Fig. 2.

Fig. 4 is an axial section of one of the rotary cutters forming part of the device, and Fig. 5 is a front view of a pair of associated cutters mounted on their common axle.

Referring to the drawings and first to Fig. 1, 1 is intended to represent a coarse-chopping device of some well-known type and 2 represents the fine-cutting device characteristic of this invention.

The fine-cutting device 2 here shown comprises a cutter shaft 4 and an electro-motor 5 serving for rotating the shaft at a speed of about 3000 rev./min. Meat or the like is fed to the coarse-chopping device 1 by means of a worm conveyer 3. Another worm conveyer 6 transfers the chopped meat from the first chopper to the fine-cutting device and participates in the propulsion of the meat through the fine cutting device. 7 is a discharge tube for the finely cut material.

8 in Fig. 2 is the casing which houses the fine-cutting knives, this casing being formed with annular cavities 9 connected in some suitable manner with each other and with cold and hot water supplies, thus enabling the cutting device to be operated at higher or lower temperatures.

10 in Fig. 2 is the intake end of the casing 8, through which enters the mass escaping from the coarse-chopping device in the direction of the arrow 11, to then flow around a streamlined guide body 12 and pass through between the radial arms 13 of the first bearing of the shaft 4. On the shaft are keyed six pairs of disc shaped knives 15, 16, 17, 18, 19 and 20. A pair of such knives (16a and 16b) is shown in Fig. 5, each one embracing one half of the circumference of the shaft 4. The knife blades of a pair extend in opposite directions with their semi-cylindrical eccentric hubs 22 embracing opposite portions of the shaft circumference. Each hub is formed with an inwardly projecting radial key 23, an axially projecting semi-annular ledge 24 on one face and a semi-annular groove 25 on the other face. The six pairs of knives are mounted on the shaft 4 in a row and several spacer rings are mounted on the shaft between adjoining pairs, each spacer ring being formed with inwardly directed keys 26, with a semi-annular ledge 27 and a semi-annular groove 28, similar to the cutter hubs. The ledges 24 and 27 fit in the grooves 25 and 28, respectively, of axially adjoining knife hubs and spacer rings and all radial keys 23 and 26 enter axial grooves 29 formed in the shaft circumference.

Fig. 2 shows the six pairs of knives symmetrically mounted on the shaft in staggered relation.

The knife blades 30 extend at right angles to the shaft axis and the blades of each pair extend in the same plane. Their cutting edges are ground on the side of the blades which leads in the direction of feed so that they exert on the material cut by them a wedge action which helps propelling the material through the device.

Instead of knife blades extending in a plane at right angles to the shaft, I may also provide knives having their blades extend at a different angle to the shaft, so that they can exert a still greater propelling effect on the meat. Such propelling action is increased by the fact that the knives are relatively staggered by 60° as shown more particularly in Fig. 3.

A central conduit 31 extending axially through the cutter shaft 4 with a central feed tube 32 communicating with an intake conduit 33 serves for feeding to the meat or the like passing through the device additional water, which is led to the working compartment 14 inside the casing 8 by way of branch conduits 34. The water introduced through these conduits is forced by the centrifugal force created by the rotation of the shaft through the meat or the like about to be comminuted and is thus intimately mixed with and evenly distributed through this material.

The end 35 of the shaft facing the entrance 11 is formed with screw thread. A nut 36 seated thereon serves for tightening the contact between the knife hubs and spacer rings.

Annular ribs 40 on the inner circumference of the casing act towards compacting locally the meat. This effect is increased by the action of ring-shaped baffles 41 resting on the ribs. By the resistance the ribs and baffles oppose to the circumferential section of the body of meat fed through the device, its passage is retardated and the cutting period lengthened accordingly.

In continuous operation a fine-cutting device as hereabove described which comprises a casing having an inner diameter of 19 in. and spacer rings of 4 in. outer diameter, when running at 3000 rev./min., cut finely 1000 lbs. of coarsely chopped animal raw fat tissue per hour and the material escaping through the outlet tube 7 had a pasty or dough-like consistency.

I wish it to be understood that I do not desire to be limited to the details shown and described in the foregoing specification and illustrated in the drawings for obvious modifications will occur to a person skilled in the art.

I claim:

1. Combined meat cutting, mixing and extruding device comprising in combination, a casing, a shaft extending through said casing, a central shaft bearing near the intake end of said casing, an end shaft bearing near the exhaust opening of said casing, a plurality of disc-shaped knife blades of wedge-like cross-section extending through about half a circle keyed on said shaft in radially staggered relation to finely cut up the meat in the machine and convey it up to the exhaust end of said casing, annular ribs formed on the inner wall of said casing in front of each pair of knives and means for driving said shaft at a speed of the order of several thousand R. P. M.

2. Combined meat cutting, mixing and extruding device comprising in combination, a casing, a shaft extending through said casing, a central shaft bearing near the intake end of said casing, an end shaft bearing near the exhaust opening of said casing, a plurality of disc-shaped knife blades of wedge-like cross-section extending through about half a circle keyed on said shaft in radially staggered relation to finely cut up the meat in the machine and convey it up to the exhaust end of said casing, annular ribs formed on the inner wall of said casing in front of each pair of knives, annular baffles leaning against the front-side of said ribs to crowd the meat in the direction toward said shaft, and means for driving said shaft at a speed of the order of several thousand R. P. M.

References Cited in the file of this patent
UNITED STATES PATENTS

| | | |
|---|---|---|
| 21,514 | Newman | Sept. 14, 1858 |
| 366,706 | Williams | July 19, 1887 |
| 774,155 | Butterfield | Nov. 8, 1904 |
| 1,904,884 | Royle | Apr. 18, 1933 |
| 2,530,503 | Bonham | Nov. 21, 1950 |